United States Patent

[11] 3,587,796

[72] Inventor Dieter K. Nestvogel
 Dineville, N.C.
[21] Appl. No. 857,789
[22] Filed Sept. 15, 1969
[45] Patented June 28, 1971
[73] Assignee Duff-Norton Company, Inc.
 Charlotte, N.C.

[54] SELF-LOCKING TRANSMISSION MECHANISM
 26 Claims, 7 Drawing Figs.
[52] U.S. Cl. .................................................. 192/8
[51] Int. Cl. .............................................. F16d 67/00
[50] Field of Search ..................................... 192/8, 7

[56] References Cited
 UNITED STATES PATENTS
| 1,607,907 | 11/1926 | Myers ......................... | 192/8 |
| 1,617,745 | 2/1927 | Cousinard ..................... | 192/8 |
| 3,051,282 | 8/1962 | Greene ......................... | 192/8 |
| 3,307,663 | 3/1967 | Luenberger ..................... | 192/8 |

Primary Examiner—Benjamin W. Wyche
Attorneys—Channing L. Richards, Dalbert U. Shefte, Francis M. Pinckney and Richards and Shefte ABSTRACT: A self-locking transmission mechanism for transmitting rotation of a drive shaft into rotation of a driven shaft through the use of drive studs connected to the drive shaft and acting through a pair of spring strips to rotate a transmission block to which the driven shaft is connected. The spring strips are disposed within a housing and have arcuate central portions disposed at an interior annular wall portion of the housing, spacer portions extending inwardly from the ends of the arcuate portions, and inturned end portions extending from the inner ends of the spacer portions to outer edges that are engageable with surfaces of the transmission block. The inturned end portions are engaged by the drive studs to bias the spring strips inwardly for movement without significant drag during drive transmitting rotation of the drive shaft, and are engaged by the transmission block to bias the spring strips outwardly and thereby impose a self-locking drag against the housing wall portion upon attempted rotation of the driven shaft independent of rotation of the drive shaft. Self-locking is also positively obtained by jamming of the spacer portions between the housing wall portion and the transmission block upon attempted independent rotation of the driven shaft.

PATENTED JUN28 1971

INVENTOR
DIETER K. NESTVOGEL

BY Richards & Shefte

ATTORNEYS

SELF-LOCKING TRANSMISSION MECHANISM

BACKGROUND OF THE INVENTION

The present invention relates to a self-locking transmission mechanism, and more particularly to a self-locking transmission mechanism that transmits rotation of a drive shaft into rotation of a driven shaft and includes a spring strip that operates to lock the mechanism against attempted overriding, reversing or rundown rotation of the driven shaft independent of rotation of the driven shaft.

Spring strips are known to be used in transmission mechanism for producing rotation resisting drag against independent rotation of a driven shaft so as to render the mechanism self-locking. Typically, these prior art transmission mechanisms have a spring strip formed with an arcuate band portion disposed at a cylindrical housing wall, against which it is biased for imposing a frictional drag. The ends of the spring strip extend generally radially inward from the band portion for engagement at their inner faces by elements connected to the drive shaft, one or the other of which elements acts during rotation of the drive shaft in either direction to apply a somewhat tangential pulling force against the spring strip, tending to draw the band portion out of drag imposing contact with the housing wall portion. Upon attempted rotation of the driven shaft in either direction independent of rotation of the drive shaft, one or the other of the spring strip ends is engaged by a member connected to the driven shaft and projecting into the space between the outer faces of the spring strip ends, with the projecting member applying a somewhat tangential pushing force against the spring strip, causing it to expand against the housing wall portion and thereby creating a rotation resisting frictional drag. A representative example of a prior art transmission mechanism of this type is disclosed in Luenberger U.S. Pat. No. 3,307,663, issued Mar. 7, 1967.

Another type of prior art self-locking transmission mechanism utilizing a spring strip of a different configuration is disclosed in Myers U.S. Pat. No. 1,607,907, issued Nov. 23, 1926. In this mechanism the spring strip is continuous, having a plurality of arcuately spaced band portions disposed at an annular housing wall portion and connected by intermediate re-entrant portions that are disposed for outward biasing upon attempted independent rotation of the driven shaft to impose a drag between the band portions and the housing wall portion. During rotation of the drive shaft, fingers engage the arcuate portions to move the spring strip with the drive shaft.

In all of these prior art mechanisms, self-locking is obtained solely by frictional drag, and the configuration and disposition of the spring strips results in a significant amount of undesirable frictional drag during transmission, with a resulting loss in power and efficiency. Moreover, any attempt to reduce the drag during transmission will result in a corresponding reduction in the ability to impose a drag sufficient for self-locking.

By the present invention, however, a self-locking transmission mechanism is provided, using a spring strip that is biased out of drag imposing disposition during drive shaft rotation in a manner that substantially eliminates the power loss and inefficiency resulting from the drag that is inherent in prior art mechanisms, and yet the spring strip is effectively biased into drag imposing disposition to resist rotation upon attempted rotation of the driven shaft independent of rotation of the drive shaft. Moreover, in addition to providing rotation resisting drag, the spring strip may be disposed to produce jamming of the mechanism to provide a positive locking against attempted independent rotation. Furthermore, the mechanism is reliable, highly efficient and quick acting, its construction is inexpensive, lightweight and simple, and it can be diametrically balanced for smooth operation.

SUMMARY OF THE INVENTION

Briefly described, the self-locking transmission mechanism of the present invention includes a rotatable drive shaft, a housing having an interior annular wall portion concentric with the axis of the drive shaft, and a driven shaft coaxially aligned with the drive shaft. Located in the housing is a spring strip having an arcuate portion disposed at the housing wall portion, a spacer portion extending inwardly from an end of the arcuate portion, and an inturned end portion extending from the inner end of the spacer portion. A drive element is connected to the drive shaft at an offset from the axis thereof for movement in a circular path upon rotation of the drive shaft and operable to transmit rotation of the drive shaft into rotation of the driven shaft. This drive element is disposed between the spring strip inturned end portion and arcuate portion and is engageable with the inturned end portion upon rotation of the drive shaft in one direction to move the spring strip with the drive element and to bias the inturned end portion and spacer portion inwardly to draw the arcuate portion inwardly for movement with the driven element without significant drag against the housing wall portion. Means is connected to the driven shaft and is engageable with the spring strip to bias the arcuate portion outwardly into drag imposing disposition against the housing wall portion to resist rotation of the driven shaft upon attempted rotation of the driven shaft in one direction independent of rotation of the driven shaft. Resistance to attempted independent rotation is also provided by the spring strip spacer portion which is disposed between the means and the housing wall portion for jamming therebetween to lock the means and driven shaft against rotation upon attempted independent rotation in one direction.

Preferably, the aforementioned means is a transmission block connected to the driven shaft for rotation therewith and disposed for biasing of the inturned end portion against the transmission block by the drive element during the aforesaid drive element biasing of the inturned end portion. For this purpose the inturned end portion extends at an inclination toward a surface of the transmission block and has an outer edge engaging the surface for pivoting of the inturned end portion thereabout by said drive element. This transmission block surface extends outward at an inclination with respect to the path of rotation for engagement with the inturned end portion for drag imposing biasing of the arcuate portion as aforesaid, and also extends at an outward inclination for jamming of the spacer portion between the surface and the housing wall portion for locking as aforesaid.

In the preferred embodiment, there is a pair of identical and diametrically symmetrical spring strips, each having its arcuate portion centrally located with spacer portions extending inwardly from both ends of the arcuate central portion, and inturned end portions extending from the inner ends of the spacer portions. Also, there are two diametrically symmetrical pairs of drive elements equally offset from the drive shaft axis, with one drive element of each pair being disposed between one spring strip inturned end portion and arcuate central portion for biasing the inturned end portion against the transmission block to draw the arcuate central portion inwardly for movement without significant drag against the housing wall portion during drive shaft rotation in one direction, and the other drive element of each pair being similarly disposed with respect to the other inturned end portion of the spring strip for similar biasing thereof during rotation of the drive shaft in the opposite direction.

The transmission block of the preferred embodiment is diametrically symmetrical and has four flat surfaces equally spaced from the drive shaft axis and each outwardly inclined with respect to the path of rotation, with each surface facing one spring strip inturned end portion. Two of these surfaces are diametrically opposed for engaging the faced inturned end portions for drag imposing biasing upon attempted independent rotation of the driven shaft in one direction and the other two surfaces are similarly disposed for drag imposing biasing upon attempted independent rotation in the opposite direction. This results in one of the two surfaces that face each spring strip imposing a drag biasing of the spring strip upon attempted independent driven shaft rotation in one direction and the other imposing a drag biasing upon attempted independent rotation in the opposite direction.

Each of the outer edges of the inturned end portions of the spring strips is offset toward an end of the facing inclined surface for drag imposing biasing upon attempted independent rotation in a direction that advances the surface toward the outer edge, and the outer edges of each spring strip are oppositely so offset for functioning in opposite directions of rotation. The spacer portions of each spring strip are also oppositely offset, but toward the ends of the surfaces that are adjacent the surfaces facing the opposite spring strip for jamming between the facing inclined surface and the housing wall portion in opposite directions of attempted independent rotation of the driven shaft, with each inturned end portion outer edge being offset opposite the offset of the spacer portion from which it extends so that the inturned end portion will be biased upon attempted independent rotation in one direction and the spacer portion will jam upon attempted independent rotation in the opposite direction. This also results in drag imposing biasing at one end, the leading end, of the spring strip arcuate portions and jamming at the other end, the trailing end, upon attempted independent rotation in either direction.

The drag imposing biasing of the spring strips not only acts directly to resist rotation, but also serves to maintain the spring strips in position for jamming of a spacer portion by the transmission block.

For effective jamming, the spacer portions of the preferred embodiment are disposed generally perpendicular to the facing surfaces of the transmission block so that the block surfaces act on the spacer portions in a direction substantially aligned with the lengths of the spacer portions.

The drag and jamming conditions do not occur during normal rotation of the drive shaft in transmitting rotation to the driven shaft, because during normal drive shaft rotation the drive elements are biasing the spring strips inwardly, thereby avoiding drag, and are moving the spring strips with the drive elements, thereby maintaining the spacer portions out of jamming disposition.

DESCRIPTION OF THE PREFERRED EMBODIMENT

Figure 1:
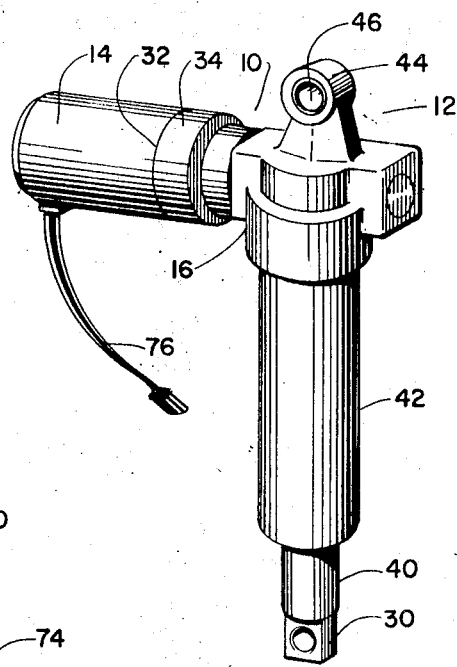
FIG. 1 is a perspective view of a self-contained mechanical actuator having incorporated therein the preferred embodiment of the self-locking transmission mechanism of the present invention.
Figure 4:
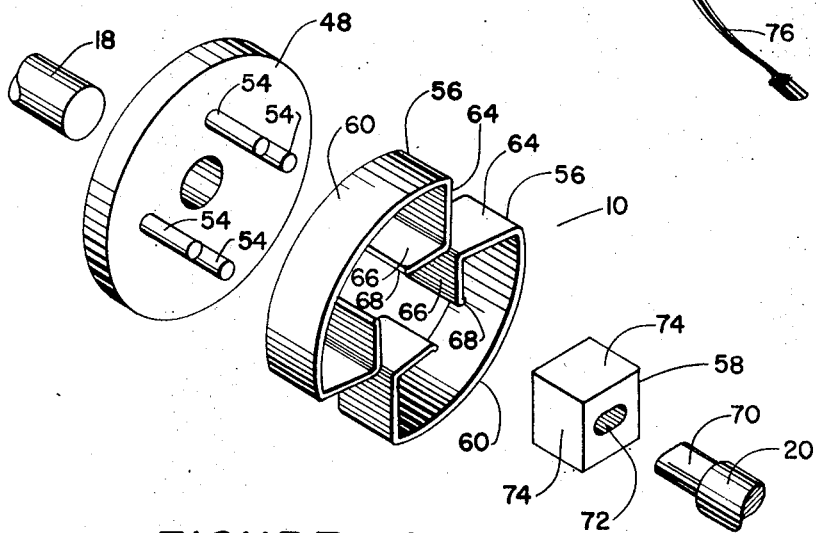
FIG. 4 is an enlarged exploded perspective view of the preferred embodiment of the self-locking transmission mechanism of the present invention as included in the actuator of FIGS. 1, 2 and 3.

The self-locking transmission mechanism 10 of the preferred embodiment of the present invention is shown in the accompanying drawings incorporated in a self-contained mechanical actuator 12. This actuator 12 includes a drive motor 14 that is secured to a housing 16 and rotatably drives a drive shaft 18 that projects into the housing 16 for connection to the self-locking transmission mechanism 10, which is disposed in the housing 16 and drivingly interconnects the drive shaft 18 and a driven shaft 20 in the form of a pinion of a gear set 22 for driving of the gear set by the motor 14. A screw member 24 is secured to the gear 26 of the gear set 22 for rotation therewith and has mounted thereon a travelling nut member 28 to which is attached a load carrying block 30 for attachment of a load to the actuator 12 for manipulation thereby.

The drive motor 14 is a reversible electrical motor of a conventional alternating current or direct current type, preferably a permanent magnet direct current type that provides an inherent braking of the drive shaft 18 when the motor is deenergized at the end of an operating stroke of the actuator 12. The motor 14 is secured to an open end 32 of a cylindrical portion 34 of the housing 16 with the drive shaft 18 projecting coaxially thereinto.

The gear set 22 is mounted in the housing 16 and is a high-efficiency, compact, skew-axis, screw-type gear set such as disclosed in Saari U.S. Pat. No. 2,696,125 and No. 2,731,886. It is drivingly connected to the inner end of the screw member 24, which has a double helix screw thread 36 formed thereon at a relatively high helix angle for high-efficiency operation.

The travelling nut 28 has a complementary interior double helix thread 38 mating with the thread 36 of the screw member 24 to transmit rotation of the screw member 24 into axial movement of the nut member 28. A translating tube 40 is secured at one end to the nut member 28 and extends beyond the screw member 24 to an outer end at which the load carrying block 30 is attached. The translating tube 40 encloses the screw member 24 and is itself enclosed by a tubular sleeve 42 that is secured to the housing 16 and extends in covering relation with respect to the screw member 24, nut member 28 and translating tube 40 to the outer end of the screw member, beyond which the translating tube 40 projects for attachment of the load carrying block 30.

To support the actuator 12 for operation, the housing 16 is formed with a projection 44 having an attaching bore 46 disposed opposite the load carrying block 30 at the axis of the screw member 24.

The illustrated actuator 12 is particularly suited for limited space applications in handling relatively light loads, such as for manipulating garden tractor accessories, for raising and lowering dental chairs, for positioning X-ray equipment, for adjusting hospital beds, and for various other uses. It is characterized by overall high efficiency, lower power requirements, balance, compactness, reliability, and rapid operation, with the self-locking transmission mechanism 10 of the present invention providing high-efficiency transmission without overriding, reversing or rundown rotation of the screw member 24 independent of rotation of the drive shaft 18 by the motor 14.

The actuator 12, in its overall combination of components is briefly described herein for purposes of illustration only and does not form a part of the present invention, which is directed to the features of the self-locking transmission mechanism 10 shown and described herein in detail in its preferred embodiment incorporated in the actuator construction. The actuator, in its overall combination, is disclosed in detail and claimed in a copending U.S. Pat. Application Ser. No. 857,911, filed Sept. 15, 1969.

The self-locking transmission mechanism 10 of the illustrated embodiment of the present invention is incorporated for purposes of illustration in the above-described actuator 12, being disposed coaxially within the aforementioned cylindrical housing portion 34. It includes cylindrical disc 48 with a central hub 50 on the side thereof facing the motor 14 and in which hub 50 the outer end of the drive shaft 18 is secured by a spring pin 52 that extends diametrically through both the hub 50 and shaft 18 to secure the disc 48 to the shaft 18 for rotation therewith. Projecting from the side of the disc 48 opposite the side facing the motor 14 are four drive elements in the form of studs 54 formed integrally with the disc 48 and extending parallel to and equally offset from the axis of the drive shaft 18 for movement in a common circular path upon rotation of the drive shaft 18, and operable to transmit rotation of the drive shaft into rotation of the aforementioned driven shaft 20. As seen in FIGS. 4—7, these drive studs 54 are arranged in two diametrically symmetrical pairs, with each pair cofunctioning with one of a pair of spring strips 56 and with a transmission block 58 to effect the self-locking transmission of the present invention.

The two spring strips 56 are identical and diametrically symmetrical, each being formed from flat thin strip stock to provide an arcuate central portion 60 shaped to conform to an interior annular wall portion of the housing 16, at which these arcuate central portions 60 are disposed and which is concentric with the axis of the drive shaft 18. In the illustrated embodiment, this wall portion is formed by an annular wear liner 62 seated in the cylindrical housing portion 34 and encircling the drive studs 54. Each of the spring strips 56 further includes a pair of spacer portions 64 extending inwardly from the opposite ends of the arcuate central portion 60, and a pair of inturned end portions 66 extending from the inner ends of the spacer portions 64 to outer edges 68 disposed for engagement by the transmission block 58.

The transmission block 58 is connected to the driven shaft 20 by the seating of the seating of the flattened end 70 of the driven shaft 20 in a similarly flattened central bore 72 formed in the transmission block 58, whereby rotation of the transmission block 58 causes identical rotation of the driven shaft 20. This transmission block bore 72 and the driven shaft 20 are coaxially aligned with the drive shaft 18 for rotation about a common axis.

Each pair of drive studs 54 is disposed within the confines of one of the spring strips 56 in the space between and spaced from the spring strip spacer portions 64. More specifically, each drive stud 54 is disposed between one of the spring strip inturned end portions 66 and the corresponding spring strip arcuate central portion 60 with the circular path of movement of the drive studs 54 intersecting the inturned end portions 66 so that upon rotation of the drive shaft 18 in either direction, such as in the direction of the arrow in FIG. 6, the drive studs 54 will move in the circular path and the leading drive stud 54 of each pair will engage the adjacent inturned end portion 66, causing it to move with the drive stud 54 and, through its engagement with the transmission block 58, causing the transmission block 58 to be rotated to transmit rotation of the drive shaft 18 into rotation of the driven shaft 20. The drive studs 54 of each pair are spaced apart a distance less than the distance between the intersections of their circular path with the inturned end portions 66 so that the trailing drive stud 54 will not be in engagement with the adjacent inturned end portion 66 during rotation, and the circular path preferably intersects or is at least close to intersecting the extent of the transmission block 58 to assure positive drive of the transmission block 58 by the drive studs 54. The diametrical symmetry of the drive stud pairs and the spring strips provides diametrically balanced transmission of rotation.

Figure 5:
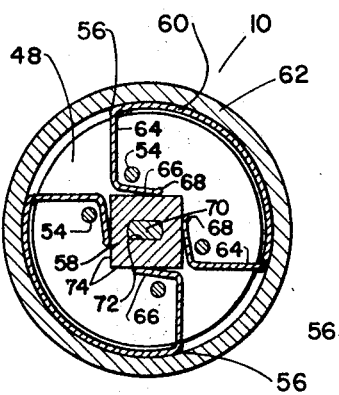
FIGS. 5—7 are enlarged vertical sectional views of the self-locking transmission mechanism of the actuator of FIGS. 1, 2, 3 and 4 taken along line 5–5 of FIG. 2 and showing the components in their various operating positions.
Figure 6:
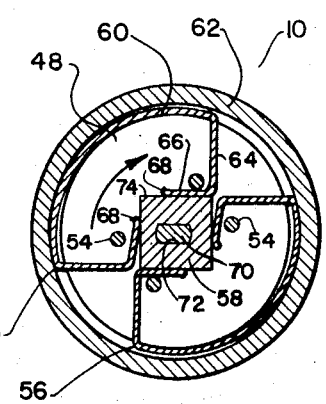

As best seen in FIG. 5, the spring strip spacer portions 64 terminate at a spacing from the transmission block 58, and the inturned end portions 66 extend therefrom at an inclination to the facing transmission block surfaces 74, with the outer edges 68 of the inturned end portions 66 engaged by the facing surfaces 74. Thus, when the drive shaft 18 is rotated, causing the drive studs 54 to move in their circular path, the leading drive studs will engage the adjacent inturned end portions 66 and cause them to pivot about their outer edges 68 against the facing transmission block surfaces 74, which results in the inturned end portions 66 and their connected spacer portions 64 being drawn inwardly away from the annular wear liner 62 for movement of the arcuate central portions 60 with the drive studs 54 without significant drag against the wear liner 62. As a result, rotation of the drive shaft 18 is transmitted by this mechanism 10 into rotation of the driven shaft 20 with little or no efficiency-reducing friction drag. Preferably, the configuration of the spring strips 56 in relation to the wear liner 62 and transmission block 58 is such that there is little or no drag between the arcuate central portions 60 and the wear liner 62 when the components are in a neutral position, such as that shown in FIG. 5.

Movement of the spring strips 56 without drag of the arcuate central portions 60 against the wear liner 62 during rotation transmission is further facilitated by the flat surface configuration of the transmission block 58, which has four flat surfaces 74 equally spaced from the drive shaft axis and symmetrically disposed with each of the flat surfaces 74 facing one of the spring strip inturned end portions 66 and having in effect, an outward inclination with respect to the path of rotation in both directions from the center point of the surface 74; and by the outer edge 68 of each spring strip inturned end portion 66 being offset from the center of the facing transmission block surface 74 toward the end of the surface that is adjacent the surface facing the other inturned end portion of the same spring strip 56. Thus, during rotation of the transmission block 58 by the leading stud elements 54 this surface inclination and offset outer edge relationship will result in movement of the inclined surface 74 away from the trailing inturned end portion outer edge 68 of each spring strip 56 so that the spring strip 56 is free to move with the drive studs 54 with its arcuate central portion 60 pulled by the leading inturned end portion 66 as aforesaid out of drag imposing contact against the wear liner 62.

Figure 7:
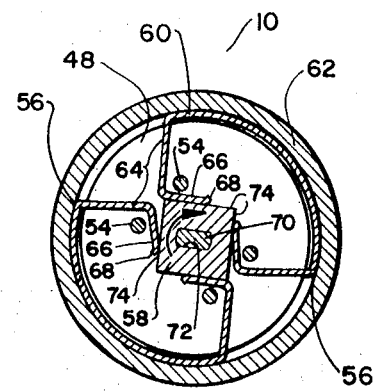
Figures 2, 3:
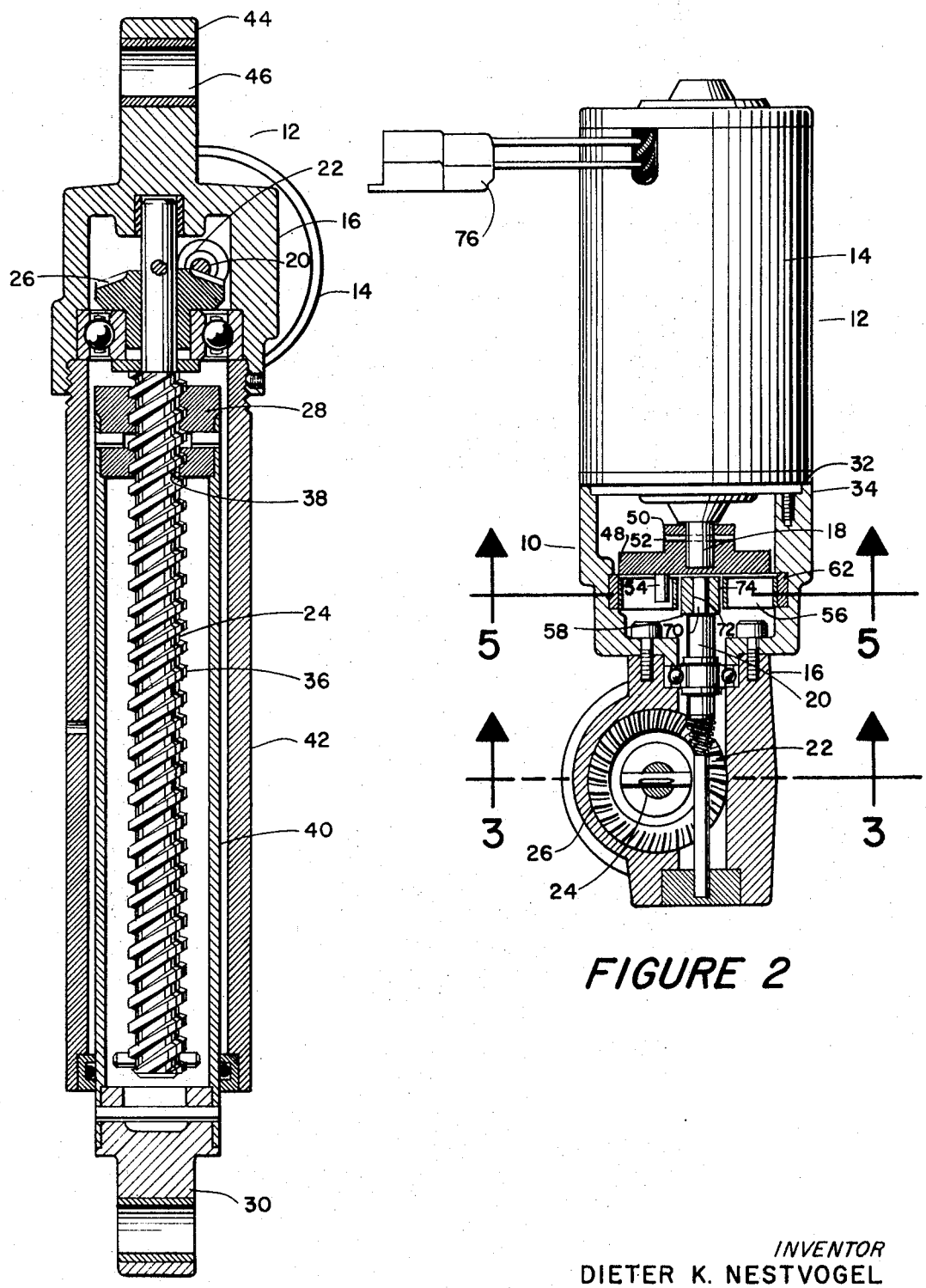
FIG. 2 is an enlarged end view, partially in section, of the actuator of FIG. 1.
FIG. 3 is an enlarged vertical sectional view of the actuator of FIGS. 1 and 2 taken along line 3–3 of FIG. 2.

This surface inclination and offset outer edge relationship also functions to a impose a rotation resisting drag upon attempted rotation of the driven shaft 20 independent of rotation of the drive shaft 18 so as to render the mechanism 10 self-locking. As seen in FIG. 7, an attempted independent rotation of the driven shaft 20 will cause the inclined surfaces 74 of the transmission block 58 to advance in a manner that applies an outward bias on the offset outer edges 68 of the inturned end portions 66 that are leading with respect to the direction of attempted rotation, such as in the direction of the arrow in FIG. 7, which outward bias is transmitted through the leading inturned end portions 66 and connected spacer portions 64 into an outward bias of the arcuate central portions 60 against the annular wear liner 62, thereby creating a drag condition that resists rotation of the spring strips 56 and, through the disposition of the outer edges 68 of the leading inturned end portions 66 in the path of the inclined surfaces 74, resists rotation of the transmission block 58 and driven shaft 20. Significantly, the relationship is such that the resistance to rotation increases in response to an increase in the force of attempted rotation. Thus, once an outward bias is imposed, causing the spring strips 56 to resist movement, any further attempted rotation or increase in the force thereof will directly increase the outward bias, thereby further increasing the resistance of the spring strips 56 to movement.

This self-locking against attempted rotation of the driven shaft 20 independent of rotation of the drive shaft 18 is also produced, but in a different manner, by the relationship between the transmission block surfaces 74 and the spring strip spacer portions 64. For this purpose, each of the spacer portions 64 is disposed between the annular wear liner 62 and the facing transmission block surface 74 in a disposition generally perpendicular to the facing surface 74 and offset from the center of the facing surface 74 toward the end of the surface that is adjacent the surface facing the opposite spring strip 56. With this offset disposition and the aforementioned inclination of the transmission block surfaces 74 with respect to the path of rotation, attempted independent rotation of the driven shaft 20 will cause the transmission block surfaces 74 to advance, as shown in FIG. 7, into engagement with the trailing spacer portions 64 of each spring strip 56 and apply an outward force thereagainst that acts in a direction substantially aligned with the lengths of the spacer portions 64 to jam the trailing spacer portions 64 between the wear liner 62 and the transmission block 58, thereby positively locking the transmission block 58 and driven shaft 20 against attempted independent rotation.

The drag imposing biasing of the leading inturned end portion 66 cooperates with the trailing spacer portion jamming to provide positive, reliable, and quick-acting, self-locking. Moreover, the drag imposing biasing of the leading inturned end portion 66 assures the establishment of the jamming condition by imposing a drag on the spring strips 56 sufficient to maintain them against movement in position for jamming of the trailing spacer portions 64 by the transmission block 58.

As seen in FIGS. 4—7, the spacer portions 64 of each spring strip 56 are oppositely offset with respect to their respective facing surfaces 74, as are the inturned end portion outer edges 68, so that they function to impose drag and jamming conditions in either direction of attempted independent rotation of the driven shaft 20 and transmission block 58. In this regard, each spring strip outer edge 68 is offset with respect to the facing transmission block surface 74 toward the end opposite the end at which its connected spacer portion 64 is offset, which opposite offset results in drag imposing biasing through the inturned end portion 66 upon attempted independent rotation in one direction and jamming of the connected spacer portion 64 upon attempted independent rotation in the opposite direction. Furthermore, as the inturned end portion outer edges 68 of each spring strip 56 are oppositely offset and as the spacer portions 64 of each spring strip 56 are also oppositely offset, drag imposing biasing will be applied at one end, the leading end, of the arcuate central portion 60 of each spring strip 56, and jamming will be produced at the other end, the trailing end, upon attempted independent rotation in either direction.

As a possible alternative, the inturned end portion outer edges 68 could be oppositely offset toward the same end as the connected spacer portions 64, which would result in both the drag and jamming conditions being imposed at the same end, the trailing end, of each spring strip, and with the opposite ends of the spring strips 56 so functioning in opposite directions of attempted independent rotation.

After the above-described drag and jamming conditions have been imposed, further or resumed rotation of the drive shaft 18 in either direction will cause the leading drive stud 54 of each pair to engage the leading inturned end portion 66 of each spring strip 56, biasing them inwardly to remove the drag condition, and moving the spring strips 56 with the drive studs 54, which pulls the trailing spacer portions 64 forwardly and the leading spacer portions 64 inwardly, and thereby breaks the jamming condition so that the spring strips 56 are again free to advance with the drive studs 54 without either drag or jamming. As drive rotation continues, the drive stud movement of the spring strips 56 maintains the spacer portions 64 out of jamming disposition.

From the foregoing description it is apparent that the transmission block 58 serves as a diametrically symmetrical means connected to the driven shaft 20 for transmitting movement of the drive studs 54 into rotation of the driven shaft 20 and engageable with the spring strips 56 to bias the arcuate central portions 60 thereof outwardly into drag imposing disposition against the housing wall portion wear liner 62 to resist rotation of the driven shaft 20 in either direction upon attempted rotation of the driven shaft 20 independent of rotation of the drive shaft 18.

The drag and jamming conditions produced as described above are imposed only upon attempted independent rotation of the driven shaft 20, not during normal rotation of the drive shaft 18, during which the drive studs 54 are biasing the spring strips 56 inwardly, out of drag imposing disposition, and are moving the spring strips 56 with the transmission block 58 so that jamming cannot occur.

In operation, the actuator 12, in which the self-locking transmission mechanism 10 of the illustrated embodiment of the present invention is incorporated, is energized from a power source through an electrical connection 76. Energization of the drive motor 14 imparts rotation to the drive shaft 18 and connected disc 48, causing the drive studs 54 to move in their circular path. As they move, the leading drive studs 54 of each pair engage the leading inturned end portion 66 of each spring strip 56, biasing then inwardly against the facing transmission block surfaces 74 for continued movement of the spring strips 56 and rotation of the transmission block 58 with the drive studs 54, thereby transmitting rotation of the drive shaft 18 into rotation of the driven shaft 20, Which is connected to the transmission block 58 for rotation therewith. During this rotation transmission the arcuate central portions 60 of the spring strips 56 are drawn inwardly by the biasing of the inturned end portions 66 for movement with the drive studs 54 without significant drag against the wear liner 62 so that there is little or no power loss through the transmission mechanism 10.

Rotation of the driven shaft 20, which serves as the pinion of the gear set 22, drives the gear set 22, which effects a gear reduction, and in turn rotates the screw member 24, causing the nut member 28 to travel and manipulate a load connected to the load carrying block 30.

The actuator 12 operates to move the load in either direction, with one drive stud 54 of each pair and one inturned end portion 66 of each spring strip 56 being the leading drive transmitting components during operation in one direction and the other drive studs 54 and inturned end portions 66 being the leading drive component during operation in the opposite direction.

When the actuator 12 is stopped, as at the end of an operating stroke, or when the load tends to reverse or override the drive motor 14, the self-locking transmission mechanism 10 functions as a brake to prevent any attempted rotation of the driven shaft 20 independent of rotation of the drive motor 14 by imposition of the drag and jamming conditions as described hereinabove, which conditions are relieved upon resumption or continued drive rotation as described hereinabove.

As described hereinabove, the transmission mechanism 10 of the present invention provides positive, effective, reliable, and quick-acting self-locking, while being operable to transmit rotation at high efficiency without significant power-losing drag. These characteristics are obtained with the particular preferred embodiment of the present invention that has been disclosed in detail herein, and can also be obtained with equivalent variations within the scope of the present invention. For example, the mechanism could be modified to use only a single spring strip 56, to provide self-locking in only one rotational direction, to impose drag biasing without jamming or jamming without drag biasing, or to accomplish other desired purposes within the scope of the present invention.

Furthermore, the incorporation of the preferred embodiment of the self-locking transmission mechanism 10 of the present invention in the disclosed self-contained mechanical actuator 12 is intended to be only an example of one representative use of the present invention, which is capable of use in various other environments where self-locking transmission is desired.

The present illustration and detailed description of the preferred embodiment of the present invention has been provided for illustrative purposes only and the scope of the present invention is not intended to be specifically limited thereto.

I claim:

1. A self-locking transmission mechanism comprising a rotatable drive shaft, a housing having an interior annular wall portion concentric with the axis of said drive shaft, a driven shaft coaxially aligned with said drive shaft, a spring strip having an arcuate portion disposed at said housing wall portion, a spacer portion extending inwardly from an end of said arcuate portion, and an inturned end portion extending from the inner end of said spacer portion, a drive element connected to said drive shaft at an offset from the axis thereof for movement in a circular path upon rotation of said drive shaft and operable to transmit rotation of said drive shaft into rotation of said driven shaft, said drive element being disposed between said spring strip inturned end portion and said spring strip arcuate portion and engageable with said inturned end portion upon rotation of said drive shaft in one direction to move said spring strip with said drive element and to bias said inturned end portion and said spacer portion inwardly to draw said arcuate portion inwardly for movement with said drive element without significant drag against said housing wall portion, and means connected to said driven shaft and engageable with said spring strip to bias said arcuate portion outwardly into drag imposing disposition against said housing wall portion to resist rotation of said shaft upon attempted rotation of said driven shaft in one direction independent of rotation of said drive shaft.

2. A self-locking transmission mechanism according to claim 1 and characterized further in that said spring strip spacer portion is disposed between said means and said housing wall portion for jamming therebetween to lock said means and said driven shaft against rotation upon attempted independent rotation of said driven shaft in one direction.

3. A self-locking transmission mechanism according to claim 1 and characterized further in that said means comprises a transmission block connected to said driven shaft for rotation therewith and disposed for biasing of said inturned end portion against said transmission block by said drive element to draw said arcuate portion inward and to transmit movement of said drive element into rotation of said driven shaft, said transmission block having a surface extending at an outward inclination with respect to the path of rotation and engaging said inturned end portion for drag imposing biasing of said arcuate portion against said wall portion upon attempted independent rotation of said driven shaft in one direction.

4. A self-locking transmission mechanism according to claim 3 and characterized further in that said inturned end portion has an outer edge engageable with said transmission block surface and about which said drive element pivots said inturned end portion to bias it against said surface.

5. A self-locking transmission mechanism according to claim 3 and characterized further in that said transmission block surface also extends at an outward inclination with respect to the path of rotation for jamming of said spacer portion between said surface and said wall portion to lock said block and driven shaft against rotation upon attempted independent rotation of said driven shaft in one direction.

6. A self-locking transmission mechanism comprising a rotatable drive shaft, a housing having an interior annular wall portion concentric with the axis of said drive shaft, a driven shaft coaxially aligned with said drive shaft, a spring strip having an arcuate central portion disposed at said housing wall portion, spacer portions extending inwardly from the ends of said arcuate portion, and inturned end portions extending from the inner ends of said spacer portions, a pair of drive elements connected to said drive shaft at an offset from the axis thereof for movement in a circular path upon rotation of said drive shaft and operable to transmit rotation of said drive shaft into rotation of said driven shaft, one of said drive elements being disposed between one of said inturned end portions and said arcuate central portion and engageable with said one inturned end portion upon rotation of said drive shaft in one direction to move said spring strip with said one drive element and to bias said one inturned end portion and one spacer portion inwardly to draw said arcuate central portion inwardly for movement with said one drive element without significant drag against said wall portion, the other of said drive elements being disposed between the other of said inturned end portions and said arcuate central portion and engageable with said other inturned end portion upon rotation of said drive shaft in the direction opposite said one direction to move said spring strip with said other drive element and to bias said other inturned end portion and the other spacer portion inwardly to draw said arcuate central portion inwardly for movement with said other drive element without significant drag against said wall portion, and means connected to said driven shaft and engageable with said spring strip to bias said arcuate central portion outwardly into drag imposing disposition against said wall portion to resist rotation of said driven shaft upon attempted rotation of said driven shaft in either direction independent of rotation of said drive shaft.

7. A self-locking transmission mechanism according to claim 6 and characterized further in that said spring strip spacer portions are disposed between said means and said wall portion for jamming therebetween of one or the other of said spacer portions to lock said means and said driven shaft against rotation upon attempted rotation of said driven shaft in either direction independent of rotation of said drive shaft.

8. A self-locking transmission mechanism according to claim 7 and characterized further in that one of said spacer portions jams between said means and said wall portion upon attempted independent rotation of said driven shaft in one direction and the other of said spacer portions jams between said means and said wall portion upon attempted independent rotation of said driven shaft in the opposite direction.

9. A self-locking transmission mechanism according to claim 8 and characterized further in that said means acts on said spacer portions in a direction substantially aligned with the lengths of said spacer portions to effect said jamming.

10. A self-locking transmission mechanism according to claim 8 and characterized further in that movement of said spring strip by said drive elements maintains said spacer portions out of jamming disposition during rotation of said drive shaft.

11. A self-locking transmission mechanism according to claim 8 and characterized further in that upon attempted independent rotation of said driven shaft said drag imposing biasing of said arcuate central portion maintains said spring strip in position for jamming of a spacer portion by said means.

12. A self-locking transmission mechanism according to claim 11 and characterized further in that said means biases the inturned end portion that is leading with respect to the direction of attempted independent rotation and jams the trailing spacer portion.

13. A self-locking transmission mechanism according to claim 6 and characterized further in that said means comprises a transmission block connected to said driven shaft for rotation therewith and disposed for biasing of said inturned end portions against said transmission block by said drive elements to draw said arcuate central portion inward and to transmit movement of said drive elements into rotation of said driven shaft, said transmission block having surfaces facing said inturned end portions, one of said surfaces extending at an outward inclination with respect to the path of rotation and engaging the faced inturned end portion for drag imposing biasing of said arcuate portion against said wall portion upon attempted independent rotation of said driven shaft in one direction, and the other of said surfaces extending at an outward inclination with respect to the path of rotation and engaging the faced inturned end portion for drag imposing biasing of said arcuate portion against said wall portion upon attempted independent rotation of said driven shaft in the opposite direction.

14. A self-locking transmission mechanism according to claim 13 and characterized further in that said transmission block surfaces also extend for jamming of one or the other of said spacer portions between said surfaces and said wall portion to lock said block and driven shaft against rotation upon attempted independent rotation thereof.

15. A self-locking transmission mechanism according to claim 14 and characterized further in that each of said surfaces effects jamming upon attempted independent rotation in the direction in which the other surface is effecting said drag imposing biasing.

16. A self-locking transmission mechanism according to claim 15 and characterized further in that said surfaces effect drag imposing biasing of the inturned end portion and spacer portion that are leading with respect to the direction of attempted independent rotation and effect jamming of the trailing spacer portion.

17. A self-locking transmission mechanism according to claim 6 and characterized further by a second spring strip identical to and disposed in diametrical symmetry with the first-mentioned spring strip, and by a second pair of drive elements identical to and disposed in diametrical symmetry with the first-mentioned pair of drive elements, and in that said means is diametrically symmetrical and is engageable with said second spring strip in the same way in which it is engageable with the first-mentioned spring strip, said two spring strips, two pairs of drive elements and symmetrical means providing diametrically balanced operation of said mechanism.

18. A self-locking transmission mechanism according to claim 17 and characterized further in that said means comprises a transmission block connected to said driven shaft for rotation therewith and disposed for transmitting movement of said drive elements into rotation of said driven shaft, said transmission block having four flat surfaces equally spaced from said drive shaft axis, each of said surfaces facing one spring strip inturned end portion with two of said surfaces being diametrically opposed for engaging the faced inturned end portions for spring strip biasing upon attempted independent rotation of said driven shaft in one direction and the other two of said surfaces being diametrically opposed for engaging the faced inturned end portions for spring strip biasing upon attempted independent rotation of said driven shaft in the opposite direction.

19. A self-locking transmission mechanism according to claim 18 and characterized further in that said inturned end portions extend from said spacer portions at an inclination toward said transmission block surfaces and have outer edges engageable by said surfaces, said drive elements pivoting said inturned end portions about said outer edges and against said surfaces during rotation of said drive shaft to effect said spring strip biasing by said drive elements.

20. A self-locking transmission mechanism according to claim 19 and characterized further in that each of said outer edges of said inturned end portions is offset toward an end of said facing surface for said drag imposing biasing of said spring strips upon attempted independent rotation of said transmission block in a direction that advances said surface toward said inturned end portion.

21. A self-locking transmission mechanism according to claim 20 and characterized further in that said outer edges of the inturned end portions of each spring strip are oppositely offset with respect to the facing surfaces for functioning in opposite directions of rotation.

22. A self-locking transmission mechanism according to claim 18 and characterized further in that each of said spring strip spacer portions is disposed between said wall portion and one of said transmission block surfaces and is generally perpendicular to said one surface and offset toward one end thereof for jamming between said wall portion and said one surface upon attempted independent rotation of said transmission block in a direction that advances said surface toward said spacer portion.

23. A self-locking transmission mechanism according to claim 22 and characterized further in that the spacer portions of each spring strip are oppositely offset with respect to the facing surfaces for jamming in opposite directions of attempted independent rotation of said driven shaft.

24. A self-locking transmission mechanism according to claim 23 and characterized further in that each said inturned end portion extends from a spacer portion at an inclination toward the facing transmission block surface and has an outer edge engageable by said surface at an offset toward the end of said surface opposite the end toward which said spacer portion is offset, said opposite offset resulting in drag imposing biasing of said inturned end portion upon attempted independent rotation of said transmission block in one direction and jamming of said spacer portion upon attempted independent rotation of said transmission block in the opposite direction.

25. A self-locking transmission mechanism according to claim 24 and characterized further in that the outer edges of the inturned end portions of each spring strip are oppositely offset and the spacer portions of each spring strip are oppositely offset for drag imposing biasing at one end of said spring strip arcuate central portion and spacer portion jamming at the other end upon attempted independent rotation of said transmission block.

26. A self-locking transmission mechanism according to claim 25 and characterized further in that said one end is the leading end with respect to the direction of attempted independent rotation and said other end is the trailing end with respect to the direction of attempted independent rotation.

PO-1050
(5/69)

UNITED STATES PATENT OFFICE
CERTIFICATE OF CORRECTION

Patent No. 3,587,796                    Dated June 28, 1971

Inventor(s) Dieter K. Nestvogel

It is certified that error appears in the above-identified patent and that said Letters Patent are hereby corrected as shown below:

Abstract page, the inventor's address should read -- Pineville, N.C. --. Column 1, line 10, "driven" should read -- drive --; line 12, "mechanism" should read -- mechanisms --. Column 2, line 15, "driven" should read -- drive --; line 22, "driven" should read -- drive --. Column 4, line 59, insert -- a -- after "includes". Column 5, line 16, delete "of the seating"; line 60, after "inwardly" insert -- thereby pulling the arcuate central portions 60 inwardly --. Column 6, line 20, delete "a" (first occurrence). Column 7, line 73, "Which" should read -- which --. Column 8, line 16 "component" should read -- components --. Column 9, line 1, before "shaft" (first occurrence) insert -- driven --.

Signed and sealed this 16th day of May 1972.

(SEAL)
Attest:

EDWARD M. FLETCHER, JR.                ROBERT GOTTSCHALK
Attesting Officer                       Commissioner of Patents